US007028176B2

(12) United States Patent
Aspegren et al.

(10) Patent No.: US 7,028,176 B2
(45) Date of Patent: Apr. 11, 2006

(54) SYSTEM FOR BOOTING DISTRIBUTED PROCESSOR ARCHITECTURE BY LOADING BOOT SOFTWARE VIA ETHERNET TO SUB-UNIT AFTER MAIN UNIT IS BOOTED AND RELEASED THE SUB-UNIT FROM RESET

(75) Inventors: Sami Aspegren, Oulu (FI); Timo Viero, Espoo (FI); Eero Heikkinen, Oulu (FI)

(73) Assignee: Nokia Corporation, Espoo (FI)

( * ) Notice: Subject to any disclaimer, the term of this patent is extended or adjusted under 35 U.S.C. 154(b) by 141 days.

(21) Appl. No.: 10/442,945

(22) Filed: May 22, 2003

(65) Prior Publication Data

US 2003/0200429 A1 Oct. 23, 2003

Related U.S. Application Data

(63) Continuation of application No. PCT/FI02/00766, filed on Sep. 24, 2002.

(30) Foreign Application Priority Data

Sep. 25, 2001 (FI) ................................. 20011881

(51) Int. Cl.
*G06F 15/177* (2006.01)
*G06F 9/445* (2006.01)
*G06F 1/24* (2006.01)

(52) U.S. Cl. ............................... 713/1; 713/2; 713/100

(58) Field of Classification Search .................... 713/1, 713/2, 100; 710/100, 300, 301, 302; 709/229
See application file for complete search history.

(56) References Cited

U.S. PATENT DOCUMENTS

| | | | | |
|---|---|---|---|---|
| 4,896,289 | A * | 1/1990 | Svinicki et al. | 714/34 |
| 5,842,011 | A | 11/1998 | Basu | |
| 6,035,346 | A * | 3/2000 | Chieng et al. | 710/10 |
| 6,282,642 | B1 | 8/2001 | Cromer et al. | |
| 6,314,520 | B1 * | 11/2001 | Schell et al. | 713/200 |
| 6,487,601 | B1 * | 11/2002 | Hubacher et al. | 709/229 |
| 6,742,068 | B1 * | 5/2004 | Gallagher et al. | 710/302 |

FOREIGN PATENT DOCUMENTS

| | | | |
|---|---|---|---|
| EP | 0 335 812 | A2 | 10/1989 |
| EP | 0 599 490 | A2 | 6/1994 |
| EP | 0 725 338 | A1 | 8/1996 |
| EP | 1 128 275 | A2 | 8/2001 |
| JP | 10097443 | A * | 4/1998 |

OTHER PUBLICATIONS

Rich Seifert, Ethernet on a backplane, Sep. 14, 1994, Newsgroups: comp.dcom.lans.ethernet, pp. 1.*

* cited by examiner

*Primary Examiner*—Thomas Lee
*Assistant Examiner*—Suresh K Suryawanshi
(74) *Attorney, Agent, or Firm*—Squire, Sanders & Dempsey LLP

(57) ABSTRACT

The invention relates to a base station comprising distributed processor architecture and a method of booting distributed processor architecture of a base station. The distributed processor architecture of the base station comprises a main unit and at least one sub-unit connected to it via the Ethernet. In the method, the main unit is booted, which main unit releases the sub-unit from reset. The control logic of the sub-unit reads the initialization parameters of the MAC controller stored in the read-only memory of the sub-unit. The MAC controller is initialized by using the read initialization parameters, after which boot software is loaded to the sub-unit via the Ethernet. Finally, the sub-unit is booted with the loaded boot software.

39 Claims, 3 Drawing Sheets

Figure 1:
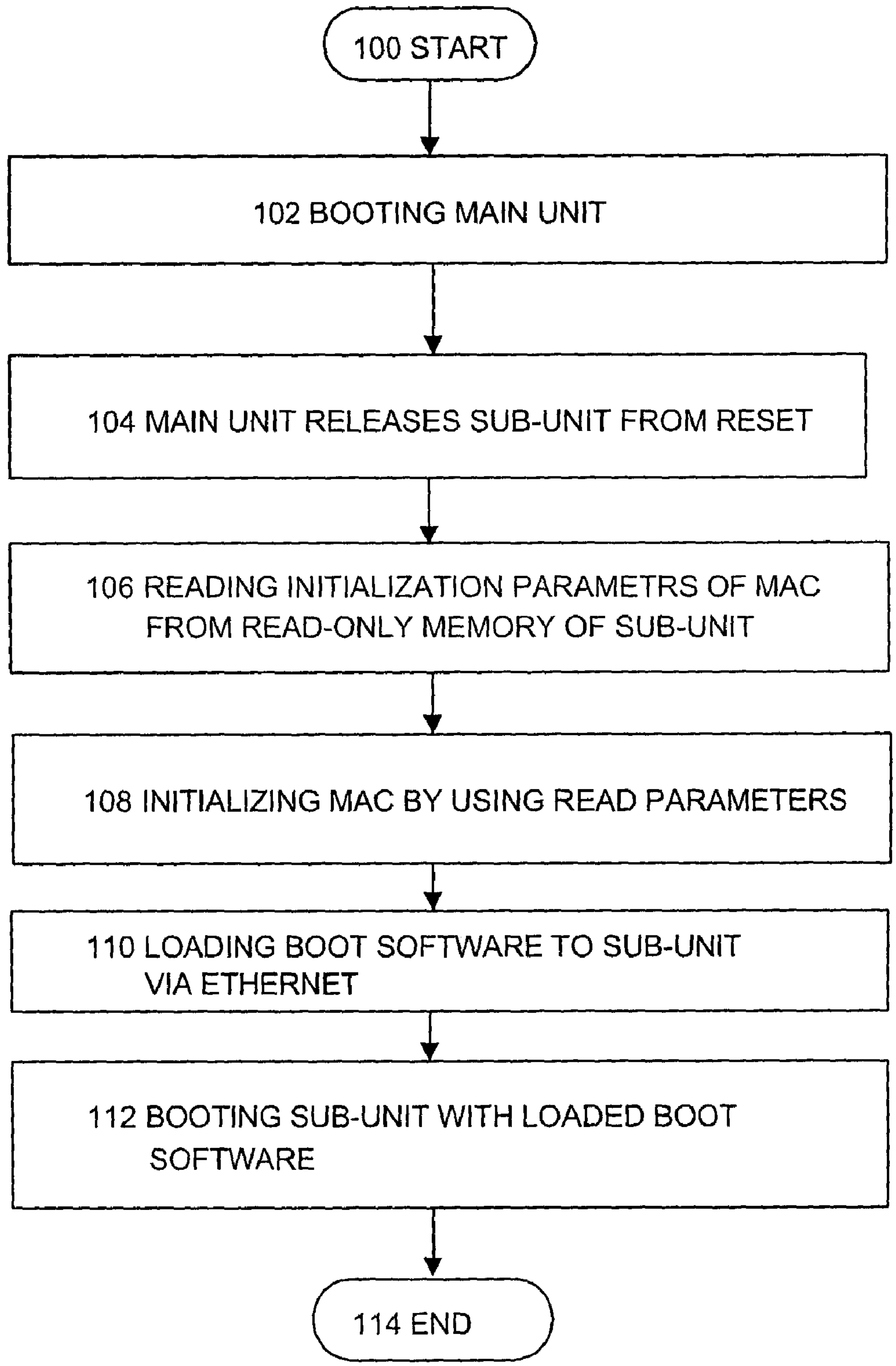

SYSTEM FOR BOOTING DISTRIBUTED PROCESSOR ARCHITECTURE BY LOADING BOOT SOFTWARE VIA ETHERNET TO SUB-UNIT AFTER MAIN UNIT IS BOOTED AND RELEASED THE SUB-UNIT FROM RESET

This is a continuation of Internation Application No. PCT/FI02/00766 filed Sep. 24, 2002, which designated the U.S. and was published under PCT Article 21(2) in English.

FIELD

The invention relates to a method of booting distributed processor architecture and to a base station.

BACKGROUND

Distributed processor architectures are in use in base stations of radio systems, both at the level of the whole base station and at the unit level. In distributed processor architectures, several processors can attend to similar tasks, such as in digital signal processing, where several digital signal processors are connected to each other. Sub-units of such distributed processor architectures can also contain other components, for instance memories and application-specific integrated circuits (ASIC).

Usually, such sub-units connected to each other boot automatically. Each sub-unit and a processor in it can be booted independently, for instance by means of boot software stored in a non-volatile memory, such as a flash memory, connected to each processor.

As regards sub-processors executing similar functions, their boot software is usually the same. The disadvantage of the prior art solutions is that non-volatile memories with identical boot codes must be connected to all sub-processors. Thus, more components are required and much printed board space is consumed. Therefore, also costs are increased. Further, when a printed board of a unit formed by the process architecture is manufactured, more solder joints are required, whereby also the manufacturing is slower and the sensitivity to failure and the failure density in the device increase.

BRIEF DESCRIPTION

An object of the invention is to provide an improved method and an improved device. One aspect of the invention is represented by the method of claim 1. Another aspect of the invention is represented by the device of claim 20. Other preferred embodiments of the invention are disclosed in the dependent claims.

The invention is based on the distributed process architecture of the base station comprising a main unit and at least one sub-unit connected to it via the Ethernet, the sub-unit being booted from the main unit to the sub-unit via the Ethernet by using loaded boot software. In the method, the main unit is booted, which main unit releases the sub-unit from reset. The control logic of the sub-unit reads the initialization parameters stored in the read-only memory of the MAC controller (Media Access Control), by means of which parameters the MAC controller is initialized. After this, the boot software is loaded to the sub-unit via the Ethernet and the sub-unit is booted with the loaded boot software.

Preferred embodiments of the invention are disclosed in the dependent claims.

A plurality of advantages is achieved with the method and distributed processor architecture of the base station according to the invention. According to the invention, fewer components are required to implement distributed processor architecture and less printed board space is consumed compared with the prior art. In this way, costs are saved. Further, when printed boards formed by the processor architecture are manufactured, fewer solder joints are required compared with the prior art solutions, whereby the manufacturing is faster and the sensitivity to failure and the failure density in the product are reduced. Also an advantage is that when a known standard interface is used, components of different component manufacturers can be combined and a system usable in several different base station solutions can be created without having to commit oneself to the solutions of certain manufacturers.

LIST OF FIGURES

Figure 3:
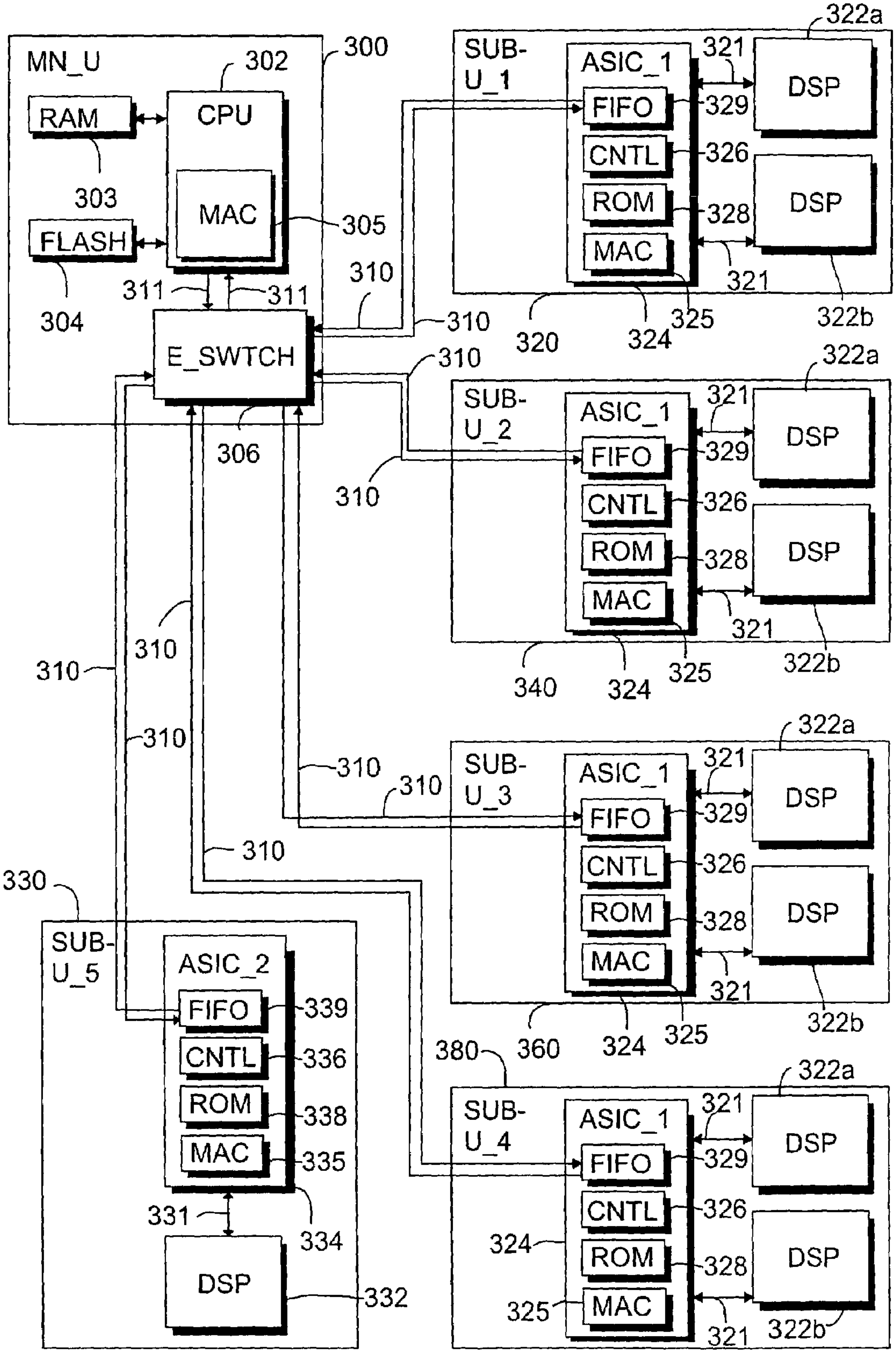

The invention is now described in more detail in connection with preferred embodiments, referring to the attached drawings, of which FIG. 1 is a flow chart showing a method of booting distributed processor architecture of a base station;

FIGS. 2_a_ and 2_b_ are simplified block diagrams showing an example of distributed processor architecture of a base station;

FIG. 3 is a simplified block diagram of an embodiment according to the invention in digital signal processing of a base station.

DESCRIPTION OF EMBODIMENTS

A method and a device implementing the method can be used to boot distributed processor architecture of a base station in a radio system. The base station can be, for instance, a third-generation base station according to the UMTS system and applying WCDMA technology, or what is called a 2.5-generation GSM/EDGE or GSM/GPRS base station applying EDGE or GPRS technology, or a second-generation base station applying GSM technology. The base station can be, for instance, an IP-connected base station, where the Internet protocol can be used in data transmission both between units and between different blocks within a unit. The method can be used to boot either the whole base station or a unit thereof.

With reference to the flow chart according to FIG. 1 and to the simplified block diagram of FIGS. 2_a_ and 2_b_, the method of booting distributed processor architecture of a base station is described. The distributed processor architecture comprises a main unit 200 and at least one sub-unit 220 connected to it via the Ethernet 218, 212, 216, the sub-unit being booted from the main unit to the sub-unit via the Ethernet 218, 212, 216 by using loaded boot software. However, the number of sub-units is not restricted to one, but, depending on the case, there may be several of them.

Performance of the method is started in 100. In 102, the main unit 200 is booted by booting the main processor 202. In the next block 104, the main unit 200 releases the sub-unit 220 from reset. After this, in accordance with a block 106, a control logic 226 of the sub-unit reads the ID information and initialization parameters of a MAC controller (Media Access Control) 230 stored in the read-only memory 228 of the sub-unit, which are used for initializing the MAC controller 230 in a block 108. Subsequently, in a block 110, boot software is loaded to the sub-unit 220 via the Ethernet.

Finally, in a block 112, the sub-unit is booted with the loaded boot software. Performance of the method is completed in a block 114.

In a preferred embodiment, the sub-unit 220 can, if required, reconfigure the MAC controller 230 after the sub-unit has been booted. Next, the application software is loaded to the sub-unit via the Ethernet 218, 212, 216. However, the application software may also be loaded to the sub-unit 220 simultaneously with the boot software.

The Ethernet is the local area network (LAN) technology most widely in use. It is usually used in data transmission for connecting together devices that are to use common resources, in other words most commonly personal computers and other devices of a data network, such as printers and disk space of file or application servers. Currently, twin cables are most commonly used as the transmission medium, possibly supplemented with fibre-optic connections, instead of coaxial cables used previously. Most Ethernet networks operate at the transmission rate of 10 Mbit/s, but also faster media are in use, for instance what is called the fast Ethernet that operates at the transmission rate of 100 Mbit/s (e.g. 100BaseTX).

The Ethernet is based on the CSMA/CD (Carrier Sense Multiple Access with Collision Detection) method according to the IEEE 802.3 standard. CSMA/CD is a method by means of which access to a shared medium is controlled. In the method, nodes listen to the signalling channel and wait for it to be free before they transmit their signal. The nodes also listen to the channel upon transmission. If two nodes transmit at the same time, a collision of the transmissions occurs and the data to be transmitted becomes corrupted. The transmission that has become corrupted is continued for a while, so that all other nodes also observe the collision. The node stops the transmission and waits for a random period of time for a new transmission attempt, so that likelihood of a new collision would not be so great.

Local network standards, such as the IEEE 802.3, i.e. the Ethernet, operate at the two lowest layers of the seven-layer OSI model. The OSI model is a theoretic model used generally to describe relations of the information network and the services supported by it by means of the protocol layer hierarchy. The OSI architecture is divided into seven protocol layers, each of which uses a layer below it and serves the layer above it. The tasks of the lowest layer, i.e. layer 1 or physical layer (PHY) include the physical connections. The tasks of layer 2, i.e. link layer or data link layer, include transmission of bits within one local area network. The Ethernet data link layer, in turn, comprises two sub-layers, i.e. the LLC and MAC layers. The LLC layer (Logical Link Control), i.e. the logical control of the data link, is the upper sublayer of the data link layer (layer 2) of the OSI model, supporting control functions of one or more logical links. MAC (Media Access Control) is the lower sub-layer of the data link layer, i.e. the interface between the LLC layer and the physical layer, controlling the access to the common transmission medium in such a way that the data link is always available during the transmission.

An MII (Media Independent Interface) connection can be used as the interface between the MAC layer and the physical layer, by means of which the means attending to the MAC functions of the Ethernet can be connected to the means of the physical layer (PHY). The MII connection can be used in both 10 Mbit/s and 100 Mbit/s applications. The MII interface is described in the standard IEEE 802.3u.

Also an RMII (Reduced Media Independent Interface) connection can be used as the interface between the MAC layer and the physical layer; the RMII connection is a variation of the MII connection defined in the standard IEEE 802.3u, being protected with a registered trademark by several different manufacturers. The pin count used in the RMII implementation is smaller than in the MII implementation.

In the following, an example of a base station implementing the method and comprising distributed processor architecture is described with reference to FIGS. 2*a* and 2*b*. A base station 250 comprises distributed processor architecture, which comprises a main unit 200 and at least one sub-unit 220 connected to it via the Ethernet network 218, 212, 216.The main unit 200 comprises a main processor 202 and a MAC controller 210 connected to it. The sub-unit 220 comprises at least one sub-processor 232 and a MAC controller 230 connected to it, a control logic 226 and a read-only memory 228, in which the initialization parameters of the MAC controller are stored.

A standard bus or a proprietary bus can be used as a bus 208 between the main processor 202 and the MAC controller 210. The MAC controller 210 of the main unit 200 can alternatively be included in the main processor 202, as shown in FIG. 2*b*. In the same way, the MAC controller 230 of the sub-unit 220 can be included in the sub-processor 232. The MAC controller refers here to both the MAC functions and to the means implementing these functions. The MAC functions can be implemented either by computer software or HW components, or by a combination thereof. The MAC functions can be implemented by means of processors, an optional Ethernet switch or application-specific integrated circuits (ASIC), for example. The MAC controller 210, 230 is used for controlling the access to the common transmission channel 218, 212, 216 in such a way that the transmission channel is always available during the transmission.

The main unit 200 can comprise a physical layer (PHY) 214, which is a component of the physical layer of the data link according to the OSI model. Correspondingly, the sub-unit 220 can comprise a physical layer (PHY) 222. The MAC controller 210 of the main unit 200 is connected to the physical layer 214 of the main unit via the Ethernet 212 and, in a preferred embodiment, by using an RMII or MII connection 212.

The physical layer (PHY) 214 of the main unit 200 is connected to the physical layer (PHY) 222 of the sub-unit by using the Ethernet connection 216, the physical layer (PHY) 222 being connected to the MAC controller 230 of the sub-unit 220 preferably by using the RMII or MII connection 212.

In addition to the Ethernet connection according to the standard, the Ethernet connection 218, 212, 216 between the main unit 200 and the sub-unit 220 can be implemented without the physical layer (PHY) 214, 222 by connecting the MAC controller 210 of the main unit 200 and the MAC controller 230 of the sub-unit 220 to a direct physical data transmission connection, for example by using the RMII or MII connection 218. If the main unit and the sub-unit are positioned in different plug-in units, the physical layer (PHY) 214, 222 must be used. The Ethernet connection 218, 212, 216 is implemented in a preferred embodiment as a full duplex point-to-point connection by using a direct RMII connection.

The Ethernet connection 218, 212, 216 can also be implemented by using an Ethernet switch. In addition, the main unit 200 comprises means 215 for booting the main unit, means 215, with which the main unit releases the sub-unit from reset, and means 215 for loading boot software to the sub-unit via the Etnernet 218, 212, 216.

Figure 2A:
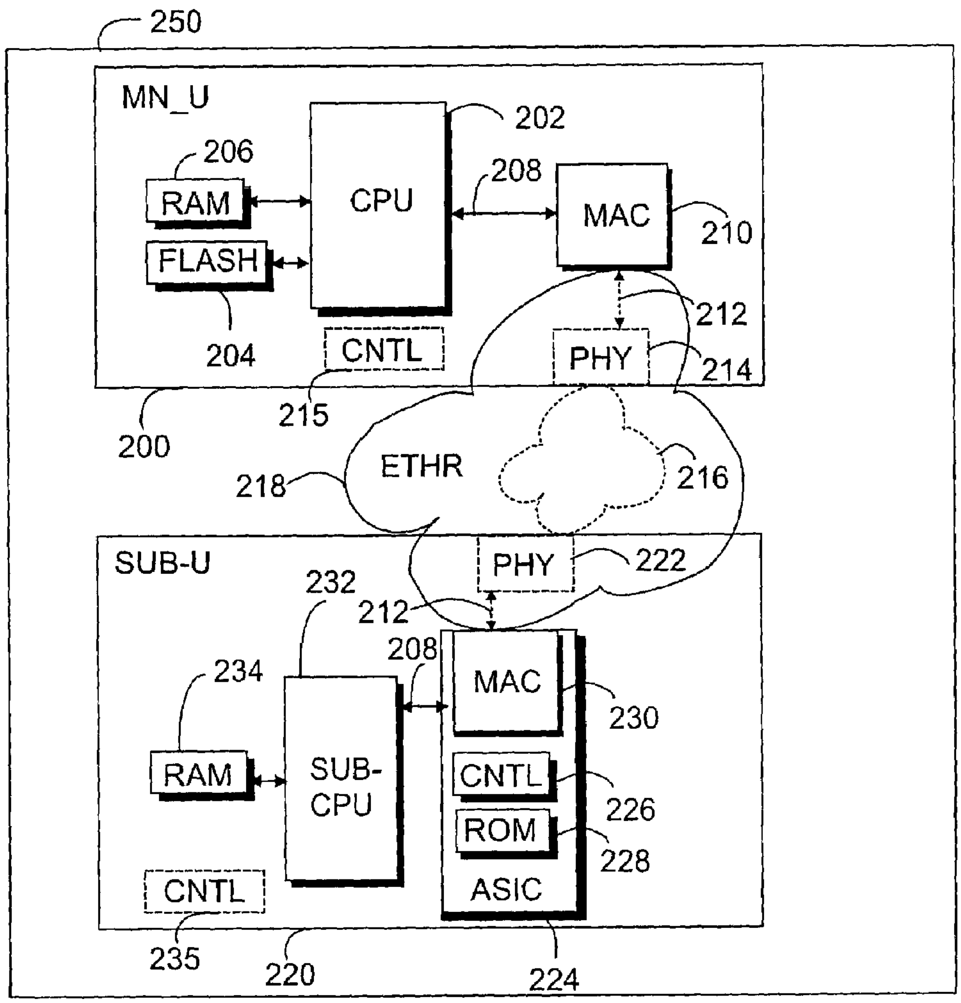
Figure 2B:
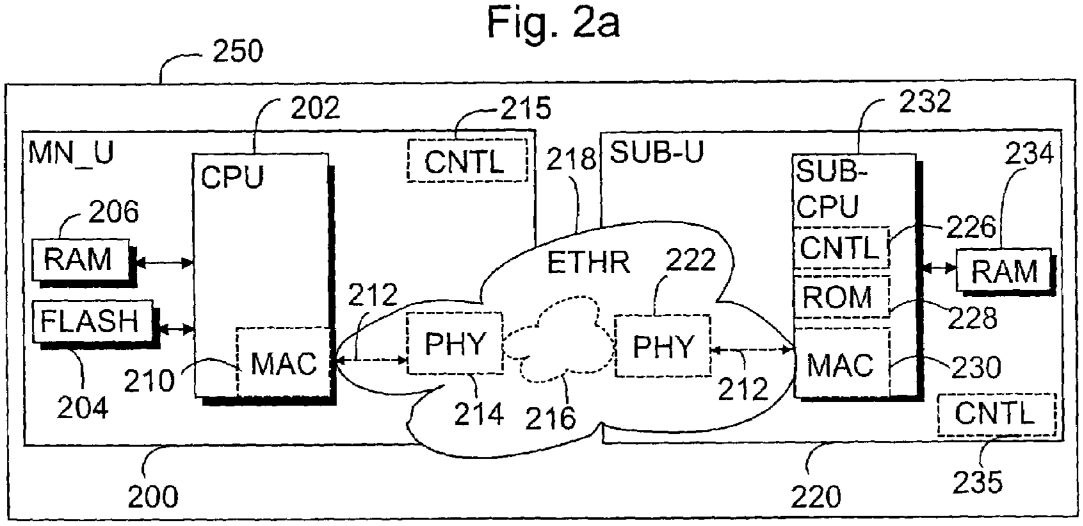

The structure of the sub-unit 220 and the number of its units can vary, but the sub-unit 220 comprises at least a sub-processor 232 and a MAC controller 230, a control logic 226 and a read-only memory 228, which may also be implemented as internal functions of the sub-processor 232 in accordance with FIG. 2*b*. The control logic 226 and the read-only memory 228 may, depending on the implementation, also be physically a part of the MAC controller 230; in other words, the MAC controller has a certain initialization mode of its own, applicable to booting. The sub-unit 220 further comprises means 235, with which the control logic 226 of the sub-unit reads the initialization parameters of the MAC controller 230 stored in the read-only memory of the sub-unit, means 235 for initializing the MAC controller by using the read initialization parameters, means 235 for booting the sub-unit with loaded boot software, and means 235, with which the sub-unit reconfigures the MAC controller.

The means 215 and 235 can preferably be implemented with a microprocessor and different peripheral devices thereof, for example with different memories, application-specific ingegrated circuits (ASIC), programmable logics and electonic circuits. In the example of FIGS. 2*a* and 2*b*, the main unit 200 comprises a random access memory (RAM) 206 and a flash memory 204, while the sub-unit 220 comprises a random access memory 234 but no flash memory. The means 215, 235 can be either partly or completely included in the other parts of the main unit 200 or sub-unit 220, for instance in the main processor 202 or sub-processor 232. Functionalities of the means 215, 235 can be implemented not only by hardware solutions but also by parts of software, for instance as program modules of processor software. At the design and implementation stages of a system, the division of functionalities between software and hardware is determined on the basis of the manufacturing costs and the required data processing capacity and speed, for example.

In FIG. 2*a*, the sub-unit 220 is implemented by using an application-specific integrated circuit 224, the main unit 200 being implemented without an application-specific integrated circuit. In FIG. 2*b*, the MAC controllers 210, 230 are included in the main processor 202 and sub-processor 232. FIGS. 2*a* and 2*b* also show optional physical layers (PHY) 214, 222, which can also be omitted. It is obvious to a person skilled in the art, however, that the distributed processor architecture of a base station can also be implemented by combining different unit implementations of the figures crosswise, deviating from what is shown in the figures. In other words, for instance, both units of the processor architecture, i.e. the main unit and the sub-unit, can be implemented by using application-specific integrated circuits, or application-specific integrated circuits can be used only in one of the units, i.e. either in the main unit or in the sub-unit, or application-specific integrated circuits can be completely omitted, as in FIG. 2*b*. Still further embodiments can be provided by leaving out the optional physical layer (PHY) 214, 222 from the above-described combinations, both from the the main unit 200 and the sub-unit 220.

With reference to FIG. 3 and to the block diagram of FIG. 2, an embodiment of the method is described as an example, applied to digital signal processing (DSP), where boot software is loaded from the main processor via the Ethernet to DSP processors serving as sub-processors.

The distributed processor architecture of a base station comprises in this embodiment a main unit 300 and five sub-units 320, 330, 340, 360, 380 connected to it via the Ethernet. In this case, four sub-units 320, 340, 360, 380 are similar, what it comes to their structure, each comprising two DSP processors 322*a* and 322*b* serving as sub-processors and an application-specific integrated circuit (ASIC) 324. The sub-unit 330 comprises one sub-processor, i.e. a DSP processor 332, and an application-specific integrated circuit 334.

The distributed processor architecture according to FIG. 3 is booted by first booting a main processor 302 of the distributed processor architecture.

Subsequently, the main unit 300 configures the physical layer (PHY) 214 of the main unit if the physical layer (PHY) is in use, and an Ethernet switch 306. An Ethernet connection 310 is implemented as a full duplex point-to-point connection by using a direct RMII connection. A connection 311 can be implemented in the same way or as a full duplex point-to-point connection by using an MII connection. When a point-to-point connection is used, the Ethernet connection 310, 311 can, however, be implemented without the switch 306 if only one sub-unit 320, 330, 340, 360, 380 is connected to the main unit 300 or if the main unit 300 has several MAC controllers 305. In the embodiment according to FIG. 3, the main unit 300 loads application software and configuration from an application manager (not shown in the figure) outside the main unit, which application manager attends to the resource management and operation and maintenance (O & M) of the base station.

The main unit 300 releases the sub-units 320, 340, 360, 380, 330 from HW reset. The application-specific circuits 324, 334 and the DSP processors 322*a*, 322*b*, 332 can be released from reset, in other words they can be reset in a particular order, whereby peaks can be avoided. Thus, the application-specific integrated circuit 324, 334 is released from reset simultaneously or prior to the DSP processor 322*a*, 322*b*, 332 connected thereto. Alternatively, reset can also be executed in such a way that the whole sub-unit 320, 340, 360, 380, 330 is released from reset at one time. Resetting can also be executed in such a way that the application-specific integrated circuits 324, 334 and the DSP processor 322*a*, 322*b*, 330 are released from reset at different times.

In the embodiment according to FIG. 3, the DSP processor 322*a*, 322*b*, 332 is implemented without a separate reset bus. However, depending on the device implementation, releasing from reset, i.e. resetting, can be executed also by using two reset buses for each sub-unit, i.e. one reset bus for the application-specific integrated circuit of the sub-unit and another reset bus for the DSP processors positioned in the same sub-unit.

The control logic 326, 336 of the application-specific integrated circuit reads the default parameters from the read-only memory 328, 338 in the application-specific integrated circuit. The default parameters include for instance MAC parameters and DMA channel configurations if DMA, i.e. direct memory access, is used. In the embodiment according to FIG. 3, MAC is configured in such a way that the MAC address is programmed as a temporary value based on the ASIC ID number known to the main unit. The application-specific integrated circuits in a single plug-in unit have different addresses. In the configuration, loopbacks are not activated (default value) and a full duplex connection, i.e. full duplex mode, is used (non-default value). Also the DMA channel is configured if direct memory access, i.e. DMA, is used.

When the configuration has been completed, the sub-unit 320, 340, 360, 380, 330 can, in accordance with the embodiment of FIG. 3, transmit an Ethernet hello packet to the main unit 300. The main unit 300 responds to this by transmitting boot software via the Ethernet connection 311, 310 to the sub-unit 320, 340, 360, 380, 330, to the MAC address found in the source address field of the Ethernet hello packet. This can be implemented in such a way, for example, that the application-specific integrated circuit 324, 334 transmits an Ethernet hello packet to the main unit 300 and configures the MAC functions in such a way that the incoming data is guided directly to the system memory of the DSP processor 322*a*, 322*b*, 332, for instance by using a PIU (Parallel Interface Unit) interface. In the embodiment according to FIG. 3, in the sub-unit 320, 340, 360, 380, where there is only one MAC address per two DSP processors 322*a*, 322*b*, the Ethernet traffic is directed only to one of the DSP processors, for instance to the DSP processor 322*a*, after which the DSP processor 322*a* transmits the data to the other DSP processor of the same sub-unit. Thus, the DSP processor 322*a* is booted first, after which it copies its own software to the DSP processor 322*b* if the processor has the same boot software, as is most often the case. If the processors have different boot software, the DSP processor 322*a* requests new boot software via the Ethernet and transmits it to the DSP processor 322*b*. The software of the main unit 300 attends to the transmission of the boot software.

Alternatively, the transmission of boot software from the main unit 300 to the sub-unit 320, 340, 360, 380, 330 can be implemented in such a way that the sub-unit 320, 340, 360, 380, 330 does not transmit an Ethernet hello packet. This can be the procedure for instance when there is no Ethernet switch 306 available. In such a case, the boot software is transmitted via the Ethernet to all sub-units 320, 340, 360, 380, 330, but sub-units that are in reset do not take this into account. Likewise, sub-units whose MAC address is programmed and MAC controller configured do not take the boot software to be transmitted into account.

The application-specific integrated circuit 324, 334 receives via the Ethernet 311, 310 implemented by RMII connections boot software, which is buffered automatically into a MAC FIFO memory 329, 339 (MAC FIFO, First in First Out) in the application-specific integrated circuit 324, 334. The connection 311 between the main processor 302 and the Ethernet switch 306 can be implemented by an MII connection or, alternatively by an RMII connection. Likewise, the RMII connection 310 could be alternatively implemented by an MII connection. In a preferred embodiment, the RMII connections as well as the MII connections are implemented by full duplex point-to-point connections.

The data is transmitted to the system memory of the DSP processor 322*a*, 322*b*, 332 by using direct memory access (DMA). However, it is not necessary to use direct memory access, but also other mechanisms are feasible. In the embodiment of FIG. 3, in the sub-unit 320, 340, 360, 380 having only one MAC address per two DSP processors 322*a*, 322*b*, the Ethernet traffic is directed to only one of the DSP processors, the DSP processor 322*a* being the one in this particular case. When the application-specific integrated circuit 324, 334 interrupts the data transmission, the DSP processors 322*a*, 322*b*, 332 start executing the boot software. The interruption of the data transmission can take place in such a way, for instance, that the application-specific integrated circuit 324, 334 sets a host interrupt register (HINT). The DSP processor 322*a*, 322*b*, 332 may comprise an internal read-only memory (not shown in the figure) containing a routine which starts to wait for a command from the host unit, in this case from the application-specific integrated circuit 324, 334 at the PIU (Parallel Interface Unit) interface. By means of the PIU, the application-specific integrated circuit (ASIC) 324, 334 can load the software directly to the system memory of the DSP processor. When the loading is completed, the application-specific integrated circuit 324, 334 signals the DSP processor 322*a*, 322*b* that the booting is completed, for instance by giving an HINT interruption, whereby the DSP processor can start executing the software. The use of the method is not dependent on the type of the processor or other device, and also other kinds of loading and data transmission mechanisms are feasible, depending on the device implementation.

In the example according to FIG. 3, the boot software of the DSP processors 322*a*, 322*b*, 332 contains functionality to understand identification of the DSP processor. The sub-unit receives its final MAC address from the main unit in connection with the boot software. The temporary MAC addresses, unique in a plug-in unit, are reconfigured into final MAC addresses that are dependent on the position of the plug-in unit in the rack (ID number of the plug-in unit). These final addresses are unique at the level of the whole base station. The main unit 300, its main processor 302, has a file, i.e. a MAC address list, which contains several base station MAC addresses. On the basis of the ID numbers, the main unit 300 selects from the file the MAC addresses belonging to its plug-in unit. The main unit 300 transmits to the sub-unit 320, 340, 360, 380, 330 a file containing the MAC addresses of the plug-in unit in question. The DSP processor 322*a*, 322*b*, 332 knows what its correct address is, and the boot software of the DSP processor reconfigures the MAC unit 325, 335 of the application-specific integrated circuit 324, 334 in such a way that the final MAC address is taken into use. Alternatively, the main unit 300 can transmit to the sub-unit 320, 340, 360, 380, 330 the final MAC address belonging to its DSP processor 322*a*, 322*b*, 332, instead of the whole MAC address list.

It is also possible to signal the ID number of the plug-in unit and, if required, also the its block ID number if the plug-in unit has several blocks, to the control logic configuring the MAC address of the sub-unit in connection with the boot software. Also the MAC address list in the main processor is in this case transmitted with the boot software, whereby the control logic of the sub-unit can form the final MAC address that is unique at the base station level on the basis of the ID numbers of the MAC address and the MAC address list of the main processor. Alternatively, the main unit 302 can transmit to the sub-unit 320, 340, 360, 380, 330 the final MAC address belonging to its DSP processor 322*a*, 322*b*, 332, instead of the whole MAC address list. Thus, instead of the above-described temporary MAC address, this address used during the running state of the base station can also be used as the MAC address of the boot stage. This procedure must be used when the main unit and the sub-unit are positioned at different plug-in units.

The software of the DSP processor 322*a*, 322*b*, 332 removes the control logic 326, 336 of the application-specific integrated circuit from use and reconfigures the MAC functions in the manner described in the boot software. This reconfiguration can mean, for instance, that the incoming Ethernet traffic is directed to an external memory connected to the DSP processor 322*a*, 322*b*, 332 or left in the buffer of the application-specific integrated circuit 324, 334 to be read by the DSP processor 322*a*, 322*b*, 332.

Next, loading of the running-state application software can be started. The application software is loaded from the main unit 300 to the sub-unit 320, 340, 360, 380, 330 via the Ethernet 311, 310. The loading can utilize for instance the Bootstrap protocol (BOOTP), the DHCP protocol (Dynamic Host Configuration Protocol) or a manufacturer-specific client/server mechanism with the Ethernet connection 311, 310. Alternatively, the application software can be loaded together with the boot software. In such a case, the main unit 300 must have the configuration information on the sub-units. The information can be located for instance at an application manager (not shown in the figure) outside the main unit, which application manager attends to the resource management and the operation and maintenance (O & M) of the base station. Thus, the main unit 300 must communicate with the application manager before the software is loaded.

Although the invention is described above with reference to the example according to the attached drawings, it is obvious that the invention is not confined thereto but can be varied in a plurality of ways within the inventive idea defined in the attached claims.

What is claimed is:

1. A method of booting distributed processor architecture of a base station, which distributed processor architecture comprises a main unit and at least one sub-unit connected to the main unit via the Ethernet, the method comprising:

booting the main unit;

releasing the sub-unit from reset by the main unit;

reading, by the control logic of the sub-unit, initialisation parameters of the media access control controller stored in the read-only memory of the sub-unit;

initializing the media access control controller by using read initialization parameters;

loading boot software to the sub-unit via the Ethernet; and booting the sub-unit with a loaded boot software.

2. A method according to claim 1, wherein the distributed processor architecture further comprises a main unit and at least one sub-unit connected to it via the Ethernet by using an Internet protocol.

3. A method according to claim 1, further comprising using the method of booting for booting the whole base station.

4. A method according claim 1, further comprising using the method of booting for unit-specific booting of at least one of the units of the base station.

5. A method according claim 1, wherein the main unit and the sub-unit are positioned in the same plug-in unit.

6. A method according to claim 1, wherein the main unit and the sub-unit are positioned in different plug-in units.

7. A method according claim 1, wherein the media access control controller of the main unit is connected to a direct physical data transmission connection with the media access control controller of the sub-unit by using the Ethernet.

8. A method according to claim 1, wherein the Ethernet connection is implemented by using reduced media independent interface connections.

9. A method according to claim 1, wherein the Ethernet connection is implemented by using media independent interface connections.

10. A method according to claims 8, wherein the Ethernet connection is implemented by a full duplex point-to-point connection.

11. A method according to claim 1, further comprising using temporary addresses stored in the read-only memory of the sub-unit as the media access control address in the configuration of the media access control controller.

12. A method according to claim 11, further comprising using identification numbers of the sub-unit as the media access control address in the configuration of the media access control controller.

13. A method according to claim 1, further comprising signalling, by the sub-unit, to the main unit that the configuration of the media access control controller has been completed by transmitting a hello packet to the main unit.

14. A method according to claim 1, further comprising, receiving, by the sub-unit, its final media access control address from the main unit in connection with the boot software.

15. A method according to claim 13, further comprising transmitting, by the main unit, the boot software to the sub-unit when it has received the hello packet from the sub-unit.

16. A method according to claim 1, further comprising using direct memory access in transmitting data from the media access control controller to the system memory.

17. A method according to claim 1, further comprising reconfiguring the media access control controller when the sub-unit has been booted.

18. A method according to claim 1, further comprising loading application software to the sub-unit via the Ethernet together with the boot software.

19. A method according to claim 1, further comprising loading application software to the sub-unit via the Ethernet.

20. A base station comprising distributed processor architecture, comprising:

a main unit comprising a main processor and a media access control controller connected to the main unit;

at least one sub-unit connected to the main unit via the Ethernet network;

wherein the sub-unit comprises at least one sub-processor and a media access control controller connected to it, a control logic and a read-only memory, where the initialization parameters of the media access control controller have been stored;

wherein the main unit comprises means for booting the main unit, means with which the main unit releases the sub-unit from reset and means for loading boot software to the sub-unit via the Ethernet; and wherein the sub-unit comprises means with which the control logic of the sub-unit reads the initialization parameters of the media access control controller stored in the read-only memory of the sub-unit, means for initializing the media access control controller by using the read initialization parameters, means for booting the sub-unit with the loaded boot software, and means with which the sub-unit reconfigures the media access control controller.

21. A base station according to claim 20, wherein the distributed processor architecture in the base station comprises a main unit and at least one sub-unit connected to it via the Ethernet by using an Internet protocol.

22. A base station according to claim 20, wherein the main unit and the sub-unit are positioned in the same plug-in unit.

23. A base station according to claim 20, wherein the main unit and the sub-unit are positioned in different plug-in units.

24. A base station according to claim 20, wherein the media access control controller of the main unit is connected to a direct physical data transmission connection with the media access control controller of the sub-unit by using the Ethernet.

25. A base station according to claim 20, wherein the Ethernet connection is implemented by using reduced media independent interface connections.

26. A base station according claim 20, wherein the Ethernet connection is implemented by using media independent interface connections.

27. A base station according to claim 20, wherein the Ethernet connection is implemented as a full duplex point-to-point connection.

28. A base station according to claim 20, wherein temporary addresses stored in the read-only memory of the sub-unit are used as the media access control address in the configuration of the media access control controller.

29. A base station according to claim 28, wherein identification numbers of the sub-unit are used as the media access control address in the configuration of the media access control controller.

30. A base station according to claim 20, wherein the sub-unit is configured to signal the main unit that the configuration of the media access control controller has been completed by sending a hello packet to the main unit.

31. A base station according to claim 20, wherein the sub-unit is configured to receive its final media access control address from the main unit in connection with the boot software.

32. A base station according to claim 30, where the main unit is configured to transmit the boot software to the sub-unit when it has received the hello packet from the sub-unit.

33. A base station according to claim 20, wherein direct memory access is used for transmitting data from the media access control controller to the system memory.

34. A base station according to claim 20, wherein the media access control controller is configured to reconfigure when the sub-unit has been booted.

35. A base station according claim 20, wherein the sub unit is configured to load application software via the Ethernet together with the boot software.

36. A base station according to claim 20, wherein the sub-unit is configured to load application software via the Ethernet.

37. A base station according to claim 20, wherein the sub-unit comprises an application-specific integrated circuit and a sub-processor connected to it.

38. A base station according to claim 37, wherein the media access control controller is included in the application-specific integrated circuit.

39. A base station according to claim 20, wherein the media access control controller is included in the processor.

* * * * *